(12) United States Patent
Thompson et al.

(10) Patent No.: US 11,606,994 B2
(45) Date of Patent: *Mar. 21, 2023

(54) BREATHABLE, WICKING NONWOVEN MATERIAL

(71) Applicant: Zephyros, Inc., Romeo, MI (US)

(72) Inventors: Greg Thompson, Simpsonville, SC (US); Marc Engel, Lingolsheim (FR); Christophe Chaut, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 230 days.

This patent is subject to a terminal disclaimer.

(21) Appl. No.: 16/955,932

(22) PCT Filed: Dec. 20, 2018

(86) PCT No.: PCT/US2018/066806
§ 371 (c)(1),
(2) Date: Jun. 19, 2020

(87) PCT Pub. No.: WO2019/126506
PCT Pub. Date: Jun. 27, 2019

(65) Prior Publication Data
US 2020/0315273 A1    Oct. 8, 2020

Related U.S. Application Data

(60) Provisional application No. 62/607,977, filed on Dec. 20, 2017.

(51) Int. Cl.
*A41D 31/12*     (2019.01)
*A41D 31/28*     (2019.01)
(Continued)

(52) U.S. Cl.
CPC ......... *A41D 31/125* (2019.02); *A41D 31/285* (2019.02); *B32B 5/266* (2021.05);
(Continued)

(58) Field of Classification Search
CPC ...... D04H 11/04; D04H 3/018; D04H 1/4391; D04H 3/073; D04H 3/077; D04H 1/413;
(Continued)

(56) References Cited

U.S. PATENT DOCUMENTS 2,689,811 A    9/1954   Frederick et al.
5,013,309 A *  5/1991   Baigas, Jr. ............ A61F 5/4401
                                                    604/385.21
(Continued)

FOREIGN PATENT DOCUMENTS

KR    20090021565 A    3/2009
WO    02/054869 A1     7/2002
(Continued)

OTHER PUBLICATIONS

International Search Report and Written Opinion for International Application No. PCT/US2018/066806; dated Mar. 19, 2019.
(Continued)

*Primary Examiner* — Jennifer A Steele
(74) *Attorney, Agent, or Firm* — The Dobrusin Law Firm, P.C.

(57) ABSTRACT

An article including one or more moisture wicking layers and one or more fibrous layers. The fibrous layers may have generally vertically oriented fibers, which may be oriented generally perpendicularly to a surface having or producing moisture. The article may be adapted to remove moisture form the surface having or producing moisture. The article may be breathable. The article may be quick drying. The article may provide cushioning. The article may be a wearable item.

19 Claims, 3 Drawing Sheets

(51) Int. Cl.
    *D04H 1/4391*     (2012.01)
    *D04H 1/413*     (2012.01)
    *D04H 1/4374*     (2012.01)
    *D04H 11/04*     (2006.01)
    *B32B 5/26*     (2006.01)

(52) U.S. Cl.
    CPC ........... *D04H 1/413* (2013.01); *D04H 1/4374* (2013.01); *D04H 1/4391* (2013.01); *D04H 11/04* (2013.01); *B32B 2255/02* (2013.01); *B32B 2255/205* (2013.01); *B32B 2307/728* (2013.01); *B32B 2437/00* (2013.01); *D10B 2401/022* (2013.01); *D10B 2401/06* (2013.01); *D10B 2401/12* (2013.01); *D10B 2401/13* (2013.01); *D10B 2501/00* (2013.01)

(58) Field of Classification Search
    CPC ........... B32B 5/022; B32B 5/26; B32B 5/266; D10B 2401/022; D10B 2401/06; D10B 2401/12; D10B 2401/13; D10B 2501/00; A61F 13/00
See application file for complete search history.

(56) References Cited

U.S. PATENT DOCUMENTS

| | | | | |
|---|---|---|---|---|
| 5,150,476 A | * | 9/1992 | Statham | A41D 31/085<br>2/81 |
| 5,558,924 A | * | 9/1996 | Chien | D04H 1/74<br>428/184 |
| 5,620,545 A | | 4/1997 | Braun et al. | |
| 5,702,801 A | * | 12/1997 | Chien | D04H 1/74<br>156/181 |
| 5,789,326 A | * | 8/1998 | Hansen | D06M 13/285<br>162/158 |
| 7,176,150 B2 | * | 2/2007 | Kopacz | D05C 17/02<br>15/208 |
| 2001/0009711 A1 | * | 7/2001 | Latimer | D04H 1/76<br>428/179 |
| 2004/0180177 A1 | * | 9/2004 | Ray | D04H 1/76<br>428/95 |
| 2008/0148468 A1 | * | 6/2008 | Laton | A41D 31/102<br>2/243.1 |
| 2009/0137937 A1 | | 5/2009 | Truelsen et al. | |
| 2011/0250409 A1 | | 10/2011 | Marte et al. | |
| 2012/0070480 A1 | * | 3/2012 | Amos | A61L 15/46<br>514/159 |
| 2015/0147518 A1 | * | 5/2015 | DeFranks | D04H 1/43828<br>428/96 |
| 2019/0248103 A1 | | 8/2019 | Piana et al. | |

FOREIGN PATENT DOCUMENTS

| | | | | |
|---|---|---|---|---|
| WO | 02/054896 A1 | | 7/2002 | |
| WO | WO-02054896 A1 | * | 7/2002 | ......... A41D 13/0025 |
| WO | 2017/081693 A1 | | 5/2017 | |

OTHER PUBLICATIONS

Non-Final Office Action dated Mar. 15, 2022, for U.S. Appl. No. 17/552,598.
Novel Nonwoven Technology, Zhiming Shen, pp. 30 and 34, China Textile Apparel Press, May 31, 1998.
Chinese Decision of Rejection dated Apr. 27, 2022, for Chinese Application 201880081946.1.
Final Office Action dated Jul. 11, 2022, for U.S. Appl. No. 17/552,598.
Advisory Action dated Aug. 30, 2022, for U.S. Appl. No. 17/552,598.

* cited by examiner

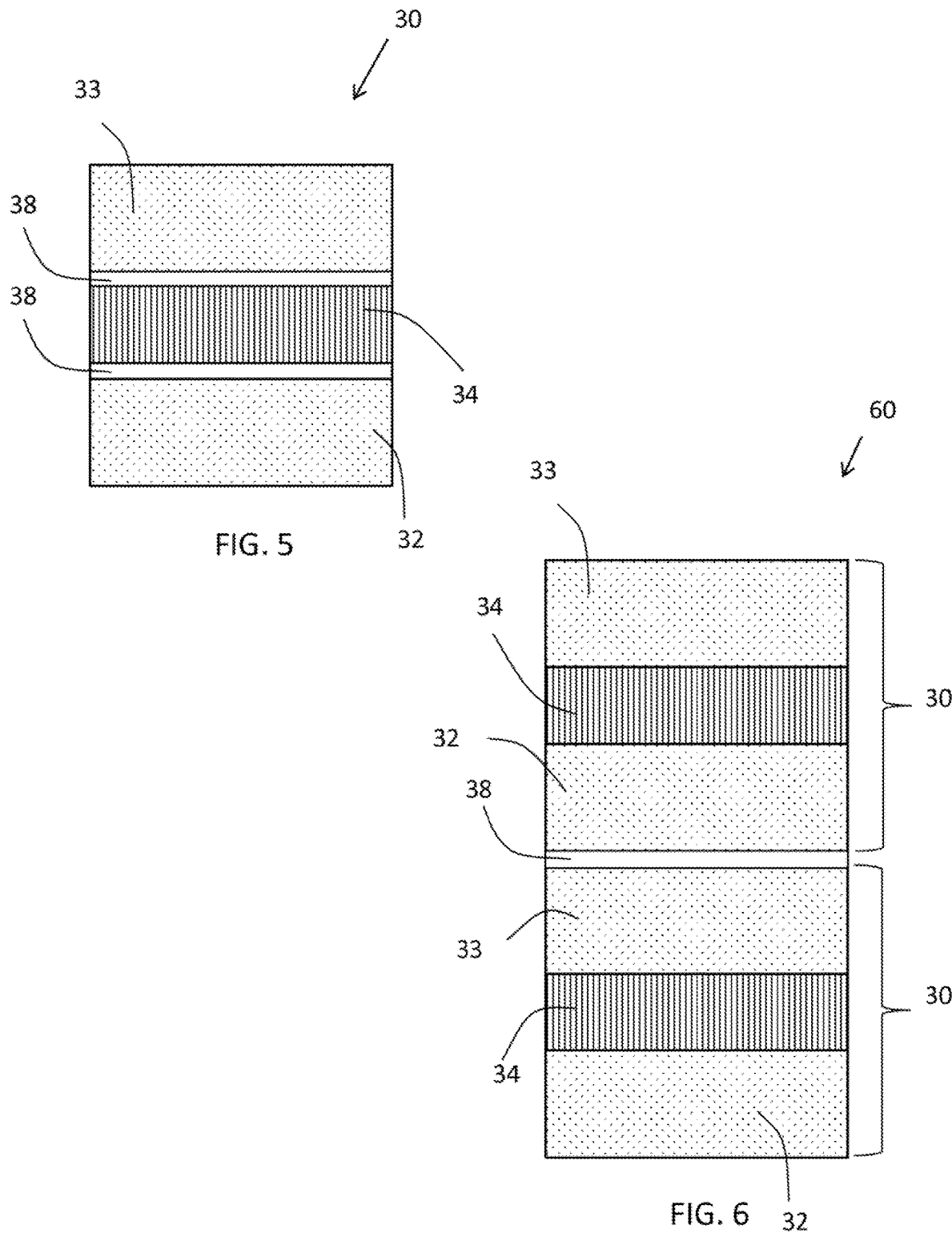

BREATHABLE, WICKING NONWOVEN MATERIAL

FIELD

The present teachings generally related to a nonwoven material, and more particularly, to a nonwoven material that is breathable and moisture wicking.

BACKGROUND

Industries are seeking new ways to provide materials with moisture resistance, breathability, cushioning, or moisture absorption while still having flexibility and physical strength. It is important that the materials are adapted for a variety of applications and allow for easy manufacturing and installation. Moisture wicking and/or cushioning materials have a wide range of applications. In clothing, it is important to pull away moisture from a wearer's body to keep the wearer cool and/or dry. Some clothing, such as sports bras, must also be supportive and may optionally include padding. In protective gear, it is important that the material provides sufficient cushioning, such as in kneepads, elbow pads, shin guards, shoulder pads, helmet liners, other headgear, while also wicking away moisture and/or being resistant to mold or mildew so the materials to reduce odor or health risks for the wearer. Cushioning is also needed in applications such as car seats, bike seats, vehicle seats, or other seats. These types of materials are also used for animal accessories, such as horse blankets and saddle pads, to protect the horse against weather and insects and to provide cushioning for the horse between its body and a saddle, for example.

In consumer products such as clothing, protective gear, animal accessories, or medical materials, for example, the materials used need to meet moisture resistance, comfortability, and structural requirements or standards. These standards may vary greatly between each industry, and thus require a highly tunable material to meet all of the requirements. For example, the clothing industry may require a moisture wicking material that feels soft when contacting a user's skin, while the medical industry may require a moisture absorbing, compressible material that is quick to dry. Due to more demanding standards throughout the industries, the materials used need to be more robust and adaptable, yet not impose an increased cost to consumers. In addition, it is desirable that certain items, such as clothing or protective gear, like kneepads and helmet liners, are washable without losing their effectiveness.

Typical materials used for providing moisture resistance or moisture absorption include closed cell foams, crosslapped felts, or materials having a horizontal fiber orientation. However, while these materials may absorb moisture, they often have poor breathability, resulting in the absorbed moisture remaining in the material, promoting the growth of fungi or bacteria and causing odor. These materials may be heavy and hot for a wearer, thereby causing and accumulating more sweat. Additional, these materials tend to have poor resiliency in applications requiring heightened stress on the material. Clothing materials, for example, typically use nylon or polyester alone to provide a sweat wicking material. However, these materials often provide poor resilience or breathability, making it uncomfortable for users that wear the clothing. These materials are often difficult to clean and may even gain weight over time due to the building up of moisture, mildew, and the like.

It may be attractive to have a material that is resistant to moisture yet also pulls moisture away from a desired surface. It may also be attractive to have a material that is easy to manufacture; quick drying; structurally resilient; odor repelling; resistant to bacteria, fungi, mold, and/or mildew; or a combination thereof. Therefore, there remains a need for a material that is moisture absorbing and/or moisture wicking. There also remains a need for a material that is antimicrobial, mildew resistant, flexible, breathable, or a combination thereof.

SUMMARY

The present teachings meet one or more of the above needs by the improved devices and methods described herein. The present teachings include a material that may provide cushioning, comfort, the ability to clean, or a combination thereof. The present teachings include a material that provides structure resiliency; comfortable product feel; moisture wicking; odor reduction or inhibition; cooling effect to the wearer; quick drying properties; is cleanable and/or washable; capability to be formed into three-dimensional shapes; or a combination thereof.

The present teachings envision an article comprising one or more moisture wicking layers and one or more fibrous layers. The fibrous layers may be oriented generally perpendicularly to a surface having or producing moisture. The fibrous layers may be formed by a vertical lapping process. The article may remove the moisture from the surface having or producing moisture. The article may be a wearable item. The surface having or producing moisture may be skin of a user's or wearer's body. The article may pull moisture from a user's skin, through the article, and onto an exterior surface of the article. The one or more fibrous layers may be sandwiched between two moisture wicking layers. A moisture wicking layer may be adapted to contact the surface having or producing moisture. An outer moisture wicking layer may face away from the surface having or producing moisture. The article, or layers thereof, may be permeable or breathable to encourage and/or facilitate evaporation of the moisture. One or more of the moisture wicking layers may transfer moisture to the one or more fibrous layers.

Fibers of the one or more fibrous layers may have a non-circular cross-section. Fibers of the one or more fibrous layers may have a cross-section having a plurality of lobes and/or deep grooves. The type and/or orientation of the fibers of the one or more fibrous layers may create a capillary effect to pull the moisture away from the surface. The article or one or more layers thereof may include an elastomeric binder to increase resilience of the article or the one or more layers. At least a portion of the fibers of the article may be thermoplastic fibers. The fibers of one or more of the layers may include polyethylene terephthalate (PET), polyacrylonitrile (PAN), oxidized polyacrylonitrile (Ox-PAN, OPAN, or PANOX), aramid, olefin, polyamide, imide, polyetherketone (PEK), polyetheretherketone (PEEK), Poly (ethylene succinate), polyether sulfonate (PES), mineral, ceramic, natural, or another polymeric fiber. One or more fibrous layers may include bicomponent fibers.

The article may exhibit structural resiliency to provide cushioning. The article or one or more layers thereof may be moldable into a three-dimensional shape. The article may be washable without losing shape, resilience, wicking properties, drying properties antimicrobial properties, or a combination thereof. The article may exhibit antimicrobial characteristics, antifungal characteristics, or both. At least a portion of the fibers of the article may be treated with or may include silver and/or copper. The article may be mold or mildew resistant. The article may be flexible. The article may be reusable. The article may be odor resistant.

BRIEF DESCRIPTION OF THE DRAWINGS

FIG. 5 is a cross-sectional view of a layered material in accordance with the present teachings;

FIG. 6 is a cross-sectional view of a layered material assembly in accordance with the present teachings;

DETAILED DESCRIPTION

Figure 1:
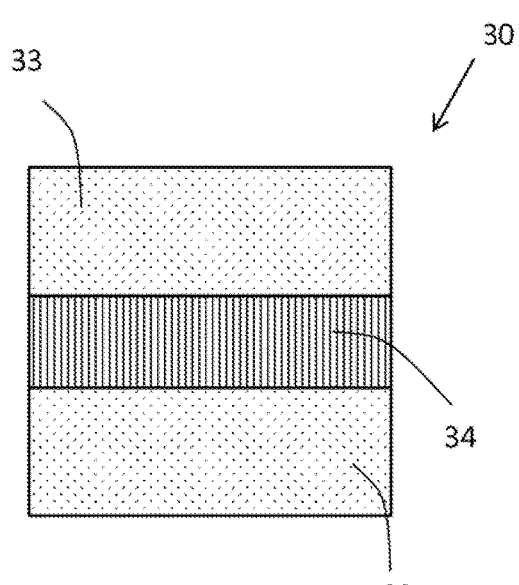
FIG. 1 is a cross-sectional view of a layered material in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Moisture wicking materials have a wide range of applications, such as in clothing, medical materials, protective gear, and animal accessories. For example, the materials may be used in athletic clothing and accessories, protective equipment, animal accessories, and medical applications, to name a few. Athletic clothing and accessories may include, but are not limited to, sports bras, biking shorts and pants, sweat bands, headbands, shirts, pants, jackets, socks, gloves, hats, and the like. Medical materials may include braces or gauze. Protective gear may include helmet liners and cushions, headgear, knee pads, elbow pads, shin guards, shoulder and chest pads, hockey pants, and the like. The materials described herein may be used for any sport padding where moisture, such as sweat, must be transported and/or dissipated while maintaining a desired or required level of protective padding. Other wearable items may include backpacks (e.g., straps or padding contacting a wearer's back), vests (e.g., protective vests), or other items that provide cushioning, insulation, and/or moisture wicking properties. Animal accessories may include pet harnesses, saddles, saddle pads, horse blankets, and the like. These materials may also find use in technologies outside of wearable items, such as in car seats (e.g., car seat cushions), bike seats, mattress pads, mattresses, pillows or pillow cases, and the like, where a user may contact the item, thereby still requiring a cooling effect, insulative effect, or moisture wicking properties.

These materials may also provide additional benefits such as compression resilience and puncture resistance, protection (e.g., clothing providing protection from the sun or by providing cushioning), breathability, padding, moisture transference (e.g., moisture is moved from a surface of a user through the material), odor inhibition, cooling effects, insulative effects, or a combination thereof. The material may be shaped to fit the area to which it will be worn or used. For example, a knee pad could be shaped to fit over and around a knee. The material may also be soft feeling, lightweight, washable, reusable, or a combination thereof.

The material may be a layered material having a plurality of layers adapted to include one or more of the above characteristics. The material may include one or more fibrous layers, where the fibers are arranged in a generally vertical orientation. The material may include one or more additional layers. These additional layers may be moisture wicking layers. For example, the layered material may include a moisture transport layer (e.g., a layer that contacts the source of moisture). Moisture wicking layers may include one or more outer layers on an opposing surface of the one or more fibrous layers. One or more of the layers, or the entire material itself, may be flexible, stretchable, breathable, or a combination thereof.

The layered material may include one or more fibrous layers. The fibrous layers may transfer moisture from one or more abutting layers. The fibrous layers may transfer moisture to one or more abutting layers. The fibrous layers may provide cushioning or protection. The fibrous layers may provide such cushioning or protection at a light weight.

One or more of the fibrous layers may have a high loft (or thickness) at least in part due to the orientation of the fibers (e.g., oriented generally transverse to the longitudinal axis of the layer) of the layer and/or the methods of forming the layer. The fibrous layers may exhibit good resilience and/or compression resistance. The fibrous layers may be resistant to puncturing. The fibrous layers, due to factors such as, but not limited to, unique fibers, surfaces, physical modifications to the three-dimensional structure (e.g., via processing), orientation of fibers, or a combination thereof, may exhibit good moisture transfer and/or absorption characteristics versus traditional materials.

The fibrous layers may be adjusted based on the desired properties. The fibrous layers may be tuned to provide a desired weight, thickness, compression resistance, or other physical attributes. The fibrous layers may be tuned to provide a desired moisture absorption or moisture transfer rate. The fibrous layers may be tuned to provide a desired drying rate. The fibrous layers may be formed from nonwoven fibers. The fibrous layers may be a nonwoven structure. The fibrous layers may be a lofted material. The fibrous layers may be thermoformable so that the layers may be molded or otherwise manufactured into a desired shape to meet one or more application requirements.

The fibrous layers may have pores. The pores may be formed from interstitial spaces between the fibers and/or the shape (e.g., by having a multi-lobal or deep-grooved cross sectional fiber) of the fibers. The pores may extend throughout the entire thickness of the fibrous layer. The pores may extend through a portion of the thickness of the fibrous layer. The pores and/or the vertical orientation of the fibers may create a capillary effect or chimney effect for absorbing moisture or removing moisture from one surface and transferring to another area (e.g., to another moisture wicking layer, to another portion of the fibrous layer, and the like). For example, the fibrous layers may push and/or pull the moisture from a first surface of the fibrous layers to an opposing second surface of the fibrous layer through a thickness of the fibrous layers. Capillary effect, or capillary action, is the ascension of liquids through a tube, pore, cylinder, or permeable substance due to adhesive and cohesive forces interacting between the liquid and the surface. The diameter of the pores or channels defined by the fibers (e.g., forming a capillary) for movement of liquid may be selected based on the thickness of the material through which the liquid must travel. A thinner diameter capillary or channel may see the liquid rise higher than liquid in a larger diameter capillary or channel due to capillary action because of adhesive forces.

The ability of the fibrous layer to pull or push moisture through the layer may be, at least in part, due to the geometries of the fibers. The fibers may have a cross-section that is substantially circular or rounded. The fibers may have a cross-section that has one or more curved portions. The fibers may have a cross-section that is generally oval or elliptical. The fibers may have a cross-section that is non-circular. Such non-circular cross-sections may create additional tubes or capillaries within which the moisture can be transferred. For example, the fibers may have geometries with a multi-lobal cross-section (e.g., having 3 lobes or more, having 4 lobes or more, or having 10 lobes or more). The fibers may have a cross-section with deep grooves. The fibers may have a substantially "Y"-shaped cross-section. The fibers may have a polygonal cross-section (e.g., triangular, square, rectangular, hexagonal, and the like). The fibers may have a star shaped cross-section. The fibers may be serrated. The fibers may have one or more branched structures extending therefrom. The fibers may be fibrillated. The fibers may have a cross-section that is a nonuniform shape, kidney bean shape, dog bone shape, freeform shape, organic shape, amorphous shape, or a combination thereof. The fibers may be substantially straight or linear, hooked, bent, irregularly shaped (e.g., no uniform shape), or a combination thereof. The fibers may include one or more voids extending through a length or thickness of the fibers. The fibers may have a substantially hollow shape. The fibers may be generally solid. The shape of the fibers may define capillaries or channels through which moisture can travel (e.g., from one side of the fibrous layer to an opposing side of the fibrous layer).

The fibers that make up the fibrous layers (or any other layer of the material) may have an average linear mass density of about 0.5 denier or greater, about 1 denier or greater, or about 5 denier or greater. The material fibers that make up the fibrous layers may have an average linear mass density of about 25 denier or less, about 20 denier or less, or about 15 denier or less. Fibers may be chosen based on considerations such as cost, resiliency, desired moisture absorption/resistance, or the like. For example, a coarser blend of fibers (e.g., a blend of fibers having an average denier of about 12 denier) may help provide resiliency to the fibrous layers. A finer blend (e.g., having a denier of about 10 denier or less or about 5 denier or less) may be used, for example, if a softer material is required to contact a user's skin. The fibers may have a staple length of about 1.5 millimeters or greater, or even about 70 millimeters or greater (e.g., for carded fibrous webs). For example, the length of the fibers may be between about 30 millimeters and about 65 millimeters. The fibers may have an average or common length of about 50 to 60 millimeters staple length, or any length typical of those used in fiber carding processes.

Short fibers may be used (e.g., alone or in combination with other fibers) in any nonwoven processes. For example, some or all of the fibers may be a powder-like consistency (e.g., with a fiber length of about 3 millimeters or less, about 2 millimeters or less, or even smaller, such as about 200 microns or greater or about 500 microns or greater). Fibers of differing lengths may be combined to provide desired properties. The fiber length may vary depending on the application; the moisture properties desired; the type, dimensions and/or properties of the fibrous material (e.g., density, porosity, desired air flow resistance, thickness, size, shape, and the like of the fibrous layer and/or any other layers of the layered material); or any combination thereof. The addition of shorter fibers, alone or in combination with longer fibers, may provide for more effective packing of the fibers, which may allow pore size to be more readily controlled in order to achieve desirable characteristics (e.g., moisture interaction characteristics).

The fibrous layer (or any other layer of the material) may include fibers blended with the inorganic fibers. The fibrous layer may include natural, manufactured, or synthetic fibers. Suitable natural fibers may include cotton, jute, wool, flax, silk, cellulose, glass, and ceramic fibers. The fibrous layer may include eco-fibers, such as bamboo fibers or eucalyptus fibers. Suitable manufactured fibers may include those formed from cellulose or protein. Suitable synthetic fibers may include polyester, polypropylene, polyethylene, Nylon, aramid, imide, acrylate fibers, or combination thereof. The fibrous layer material may comprise polyester fibers, such as polybutylene terephthalate (PBT), polyethylene terephthalate (PET), polytrimethylene terephthalate (PTT), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures. The fibers may include mineral or ceramic fibers. The fibers may be or may include elastomeric fibers. Elastomeric fibers may provide cushioning performance and/or compressibility and recovery properties. Exemplary elastomeric fibers include elastic bicomponent PET, PBT, PTT, or a combination thereof. The fibers may be formed of any material that is capable of being carded and lapped into a three-dimensional structure. The fibers may be 100% virgin fibers, or may contain fibers regenerated from postconsumer waste (for example, up to about 90% fibers regenerated from postconsumer waste or even up to 100% fibers regenerated from postconsumer waste). The fibers may have or may provide improved moisture absorption or moisture resistance characteristics, or both.

The fibers may have particles embedded therein. The particles may act to remove moisture in the vapor stage (e.g., before becoming liquid). The particles may be embedded through an extrusion process. These particles may provide breathability and/or waterproofing properties to the fibrous layer. The particles present in the fibers may increase the surface area of the fiber by 50% or more, about 100% or more, by 200% or more, or by 500% or more as compared with a fiber that is free of embedded particles. The particles may increase the surface area of the fiber by about 1200% or less, about 1000% or less, or about 900% or less. The high surface area of the fiber may provide high adsorption properties. These fibers may assist in providing heating and/or cooling. These fibers may provide odor control, humidity control (e.g., body humidity control), or both. The particles may assist in removing or driving moisture vapor away from the source (e.g., through the layer). Embedded particles may include, but are not limited to, wood, shells (e.g., fruit and/or nut shells, such as coconut shells or fibers thereon, hazelnut shells), activated carbon, sand (e.g., volcanic sand), or a combination thereof. For example, the fiber may be a PET fiber extruded with active carbon and/or volcanic sand.

The fibers may be 100% virgin fibers or less. The fibers may include fibers regenerated from postconsumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. Such fibers may be useful for retaining heat or slowing the rate of heat transfer (e.g., to keep a user or wearer warm). The fibers may have or may provide high thermal conductivity, thereby increasing the rate of heat transfer. Such fibers may be useful for extracting heat from the surface of the source of moisture (e.g., to cool a user or wearer). The fibers may have geometries that are non-circular or non-cylindrical. The fibrous layer may include or contain engineered aerogel structures to impart additional thermal insulating benefits. The fibrous layer may include or be enriched with pyrolized organic bamboo additives.

The fibers, or at least a portion of the fibers, making up one or more layers of the material may include a hydrophilic finish or coating. The hydrophilic finish or coating may create or improve the capillary effect of drawing the moisture into the capillaries or channels formed by the fibers. The fibers, or at least a portion of the fibers, may be super absorbing fibers (SAF). The SAF may be formed of a cellulose material or a synthetic polymeric material, for example. The SAF may be in a blend with other fibers. The SAF may be present in an amount of about 60% of the blend by weight or less, about 50% by weight or less, or about 40% by weight or less. The SAF may be present in an amount greater than 0%, about 1% by weight or greater, or about 5% by weight or greater. The SAF may pull moisture into the material cross-section, where it may evaporate.

One or more fibrous layers (or any other layer of the material) may include a plurality of bi-component fibers. The bi-component fibers may be a thermoplastic lower melt bi-component fiber. The bi-component fibers may have a lower melting temperature than the other fibers within the mixture (e.g., a lower melting temperature than common or staple fibers). The bi-component fibers may be air laid or mechanically carded, lapped, and fused in space as a network so that the layered material may have structure and body and can be handled, laminated, fabricated, installed as a cut or molded part, or the like to provide desired properties. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers.

The fibrous layer (or any other layer of the layered material) may include a binder or binder fibers. Binder may be present in the fibrous layer in an amount of about 100 percent by weight or less, about 80 percent by weight or less, about 60 percent by weight or less, about 50 percent by weight or less, about 40 percent by weight or less, about 30 percent by weight or less, about 25 percent by weight or less, or about 15 percent by weight or less. The fibrous layer may be substantially free of binder. The fibrous layer may be entirely free of binder. While referred to herein as fibers, it is also contemplated that the binder could be generally powder-like, spherical, or any shape capable of being received within interstitial spaces between other fibers and capable of binding the fibrous layer together. The binder may have a softening and/or melting temperature of about 70° C. or greater, about 100° C. or greater, about 110° C. or greater, about 130° C. or greater, 180° C. or greater, about 200° C. or greater, about 225° C. or greater, about 230° C. or greater, or even about 250° C. or greater. For example, the binder may have a softening and/or melting temperature between about 70° C. and about 250° C. (with any range therein being contemplated). The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), polyether imide (PEI); and the like. The fibrous layer may include polyacrylate and/or epoxy (e.g., thermoset and/or thermoplastic type) fibers. The fibrous layer may include a multi-binder system. The fibrous layer may include one or more elastomeric fiber materials acting as a binder. The fibrous layer may include one or more sacrificial binder materials and/or binder materials having a lower melting temperature than other fibers within the layer.

The fibers and binders discussed herein in the context of the fibrous layers may also be used to form any other layer of the layered material.

The fibers forming the one or more fibrous layers may be formed into a nonwoven web using nonwoven processes including, for example, blending fibers, carding, lapping, air laying, mechanical formation, or a combination thereof. Through these processes, the fibers may be oriented in a generally vertical direction or near-vertical direction (e.g., in a direction generally perpendicular to the longitudinal axis of the fibrous layer). The fibers may be opened and blended using conventional processes. The resulting structure formed may be a lofted fibrous layer. The lofted fibrous layer may be engineered for optimum weight, thickness, physical attributes, thermal conductivity, insulation properties, moisture absorption, or a combination thereof.

One or more fibrous layers may be formed, at least in part, through a carding process. The carding process may separate tufts of material into individual fibers. During the carding process, the fibers may be aligned in substantially parallel orientation with each other and a carding machine may be used to produce the web.

A carded web may undergo a lapping process to produce the fibrous layers. The carded web may be rotary lapped, cross-lapped or vertically lapped, to form a voluminous or lofted nonwoven material. The carded web may be vertically lapped according to processes such as "Struto" or "V-Lap", for example. This construction provides a web with relative high structural integrity in the direction of the thickness of the fibrous layers, thereby minimizing the probability of the web falling apart during application, or in use, and/or providing compression resistance to the layered material. Carding and lapping processes may create nonwoven fibrous layers that have good compression resistance through the vertical cross-section (e.g., through the thickness of the layered material) and may enable the production of lower mass fibrous layers, especially with lofting to a higher thickness without adding significant amounts of fiber to the matrix. It is contemplated that a small amount of hollow conjugate fiber (i.e., in a small percentage) may improve lofting capability and resiliency to improve moisture absorption, physical integrity, or both. Such an arrangement also provides the ability to achieve a low density web with a relatively low bulk density.

The lapping process may create a pleated or undulated appearance of the fibers when viewed from its cross-section. The frequency of the pleats or undulations may be varied during the lapping process. For example, having an increase in pleats or undulations per area may increase the density and/or stiffness of the layer or layers of the material. Reducing the pleats or undulations per area may increase the flexibility of the layer or layers and/or may decrease the density. The ability to vary the pleat or undulation frequency during the lapping process may allow for properties of the material to be varied or controlled. It is contemplated that the pleat or undulation frequency may be varied throughout the material. During the lapping process, the pleat frequency may be dynamically controlled and/or adjusted. The adjustment may be made during the lapping of a layer of the material. For example, certain portions of the layer may have an increased frequency, while other portions of the layer or layers may have a frequency that is lower. The adjustment may be made during the lapping of different layers of the material. Different layers may be made to have different properties with different pleat frequencies. For example, one layer may have a pleat frequency that is greater than or less than another layer of the layered material.

The fibrous layers may be formed by an air laying process. This air laying process may be employed instead of carding and/or lapping. In an air laying process, fibers are dispersed into a fast moving air stream, and the fibers are then deposited from a suspended state onto a perforated screen to form a web. The deposition of the fibers may be performed by means of pressure or vacuum, for example. An air laid or mechanically formed web may be produced. The web may then be thermally bonded, air bonded, mechanically consolidated, the like, or combination thereof, to form a cohesive nonwoven fibrous layer. While air laying processes may provide a generally random orientation of fibers, there may be some fibers having an orientation that is generally in the vertical direction so that resiliency in the thickness direction of the material may be achieved.

The layered material may include one or more wicking layers. The wicking layers may be formed from a nonwoven material, a woven material, a knit material, a meltblown material (e.g., of thermoplastic polyurethane), or the like. These wicking layers may include one or more moisture transport layers, which may serve to transport the moisture from the source (e.g., skin or another moist layer, such as a garment) to the one or more fibrous layers. The one or more moisture transport layers may draw moisture from the source and distribute the moisture over a wider surface area to enhance absorption by other layers, to enhance evaporation or drying of the moisture, or both. One layer may serve as an acquisition layer, which may function to draw moisture from the source. Another layer may serve as a distribution layer, which may function to disperse moisture around the area of the layer and/or adjacent layers. These functions may instead be performed by a single layer. The wicking layers may include one or more outer layers. The outer layers may be located on the opposing side of the fibrous layers, taking up moisture from the fibrous layers. The outer layers may encourage evaporation or have quick drying properties. The wicking layers of the layered material may be the same or they may be different. One or more of the layers may draw moisture in vapor form away from the source. For example, one or more layers may pull perspiration vapor away from a body before the perspiration becomes liquid sweat.

The one or more moisture transport layers may be attached to one side of a fibrous layer. The one or more moisture transport layers may be adapted to abut or contact a surface that is the source of the moisture. For example, a moisture transport layer may be a contact surface for a person's skin or an animal's body. The moisture transport layer may facilitate movement of sweat or moisture from skin to the fibrous layer. The moisture transport layer may have a smooth-to-the-touch surface to provide a comfortable contact surface.

The outer layers of the layered material may be attached to an opposing side of the fibrous layer. The one or more outer layers may face away from the surface of the source of the moisture. The one or more outer layers may be the outermost layer of the layered material. The one or more outer layers may be permeable or breathable to allow for air flow within the layer. The breathability or permeability may enhance the evaporation of the moisture, thereby allowing the layered material to dry. The outer layer may include perforations, apertures, voids, or openings to further encourage permeability and/or drying of the layer.

The wicking layers may be formed using any of the fibers and/or binders discussed herein with respect to the fibrous layer. One or more wicking layers may be made from Lycra, polyester, polyethylene terephthalate, or a combination thereof.

One or more fibrous layers, the fibers forming the fibrous layers, the resulting layered material, or a combination thereof, may be used to form a thermoformable layered material (which may be nonwoven), which indicates a material (e.g., nonwoven material) that may be formed with a broad range of densities and thicknesses and that contains a thermoplastic and/or thermoset binder. The thermoformable material may be heated and thermoformed into a specifically shaped thermoformed product. The layered material may have a varying thickness (and therefore a varied or non-planar profile) along the length of the material. Areas of lesser thickness may be adapted to provide controlled flexibility to the material, such as to provide an area with additional flexibility and elasticity, such as to form a stretchable compression article of clothing. The layered material may be shaped (e.g., by folding, bending, thermoforming, molding, and the like) to produce a shape generally matching a desired shape for a given application.

The layered material may be formed of a plurality of layers, including one or more wicking layers, (e.g., one or more moisture transport layers, one or more outer layers), one or more surface layers, one or more skin layers, and/or one or more fibrous layers, in any combination and in any order. The material may include two or more fibrous layers. The layered material may include one or more lofted layers, one or more wicking layers, or both. A skin layer may be formed by melting a portion of the layer by applying heat in such a way that only a portion of the layer, such as the top surface, melts and then hardens to form a generally smooth surface. A scrim may be applied or secured to one or more fibrous layers. The layered material may include a plurality of layers, some or all of which serve different functions or provide different properties to the layered material. The ability to combine layers having different properties may allow the layered material to be customized based on the application. For example, the layers may be combined so that the layered material is an article of clothing that is moisture wicking, moisture transferring, insulative, cooling, has low drying times, or a combination thereof. The layers may be combined so that the layered material provides cushioning with high resilience.

A coating may be applied to form one or more surface layers on the fibrous layers. The coating may improve one or more characteristics of the layered material. For example, the surface layers may be anti-microbial, anti-fungal, have high infrared reflectance, moisture resistant, mildew resistant, or a combination thereof. The surface layers may be an extension of the fibrous layers or wicking layers. At least some of the surface layers may be metalized. For example, fibers along an outer surface of the fibrous layers or wicking layers may form the surface layers. Metallization processes can be performed by depositing metal atoms onto the fibers of the surface layers. As an example, metallization may be established by applying a layer of silver atoms to the surface layers. Metalizing may be performed prior to the application of any additional layers to the fibrous layers.

The metallization may provide a desired reflectivity or emissivity. The surface layers may be about 50% IR reflective or more, about 65% IR reflective or more, or about 80% IR reflective or more. The surface layers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibrous layers to form the surface layers, metallized or not, to achieve desired properties. Oleophobic and/or hydrophobic treatments may be added. Flame retardants may be added. A corrosion resistant coating may be applied to the metalized fibers to reduce or protect the metal (e.g., aluminum) from oxidizing and/or losing reflectivity. IR reflective coatings not based on metallization technology may be added. Anti-microbial or anti-fungal coatings may be applied. For example, silver powder or other antimicrobial nano-powders can be added into a portion of the fibrous layers to form the surface layers.

One or more layers may be a porous bulk absorber (e.g., a lofted porous bulk absorber formed by a carding and/or lapping process). One or more layers may be formed by air laying. The layered material may be formed into a generally flat sheet. The layered material (e.g., as a sheet) may be capable of being rolled into a roll. The layered material may be a continuous material so that longer lengths can be employed in a single piece. The layered material (or one or more of the layers of the layered material) may be an engineered 3D structure. It is clear from these potential layers that there is great flexibility in creating a material that meets the specific needs of an end user, customer, installer, and the like.

The fibrous layers, the wicking layers, the surface layers, or a combination thereof may be directly attached to one another. One or more layers may be attached to each other by a laminating process. The one or more layers may then be supplied as a roll or a sheet of the laminated product. The one or more layers, therefore, may be attached to each other prior to any additional shaping or molding steps. The one or more layers may include a thermoplastic component (e.g., binder or fibers) that melt and bond to an adjacent surface upon exposure to heat. One or more layers may be attached to each other with an adhesive layer. The layers forming a layered material may be attached to an additional layered material. For example, a first layered material may be directly attached to a second layered material (e.g., by one or more adhesive layers) to form a layered material assembly. The layered material assembly may include more than two layered materials. The adhesive layer may be an adhesive. The adhesive may be a powder or may be applied in strips, sheets, or as a liquid or paste. The adhesive layer may extend along a surface of the fibrous layers, the wicking layers, the surface layers, or a combination thereof, to substantially cover the surface. The adhesive layer may be applied to a portion of the surface of the fibrous layers, the wicking layers, the surface layers, or a combination thereof. The adhesive layer may be applied in a pattern (e.g., dots of adhesive applied to the surface). The adhesive layer may be applied in a uniform thickness. The adhesive layer may have varying thickness. The adhesive layer may be a single layer (e.g., a single adhesive). The adhesive layer may be multiple layers (e.g., an adhesive layer and a thermoplastic fiber layer). The adhesive layer may be a single layer of blended materials (e.g., an adhesive and thermoplastic fibers are blended in a single layer). The layers may be directly attached to each other via other processes, such as by sewing, entanglement of fibers between layers, or other methods.

The total thickness of the layered material may depend upon the number and thickness of the individual layers. The total thickness may be about 0.5 mm or more, about 1 mm or more, or about 1.5 mm or more. The total thickness may be about 300 mm or less, about 250 mm or less, or about 175 mm or less. Some of the individual layers may be thicker than other layers. For example, the thickness of the fibrous layers may be greater than the thickness of the wicking layers (individually or combined). The total thickness of the fibrous layers may be greater than the total thickness of the wicking layers. The thickness may vary between the same types of layers as well. For example, two fibrous layers in the layered material may have different thicknesses. The layered material may be tuned to provide desired characteristics and/or more general broad band moisture absorption/resistance by adjusting the specific air flow resistance and/or the thickness of any or all of the layers.

One of more of the layers of the layered material may have hydrophobic properties. One or more of the layers of the layered material may have hydrophilic properties. Entire layers may be hydrophobic or hydrophilic. A layer may have both hydrophobic and hydrophilic properties. For example, a layer may be formed from a mixture of hydrophobic fibers and hydrophilic fibers. The interfaces between layers may include one hydrophobic layer or portion abutting a hydrophilic layer or portion. The layer contacting the source of the moisture may be hydrophilic. Such layer may cause moisture to wick away from the skin and distribute the moisture over a larger area to quicken the wicking. Adjacent layers may, for example, be hydrophobic. This may assist in the drying of the material and/or resisting the uptake of moisture from the external environment. It is also possible that a hydrophobic layer or portions thereof may function to draw moisture away from a surface (e.g., a user's skin) while absorbing little to no moisture, thereby acting to wick away the moisture. The hydrophobic layers or portions thereof may function to transfer moisture to another layer of the layered material. The hydrophilic layers or portions thereof may function to absorb moisture (e.g., from one or more hydrophobic layers or portions). Fibers within the layers may be hydrophobic. Fibers within the layers may be hydrophilic.

Fibers of one or more layers of the layered material, or one or more layers of the layered material, may exhibit antimicrobial properties. The fibers may be treated with an antimicrobial substance. For example, silver or copper may be used. Fibers may be coated with silver, copper, or a combination thereof. The antimicrobial substance may be otherwise deposited on the surface of the fibers (e.g., via sputtering, electrostatic deposition). The antimicrobial substance may be part of the fibers. For example, silver particles, copper particles, or both, may be within fibers of the one or more layers of the layered material.

The layered material disclosed exhibits breathability, which allows for an increased drying time of the material and/or increased cooling of the surface of the source of the moisture. With the ability for air to permeate the material, this increases the drying time, thereby also decreasing the formation of mold, mildew, and/or odors. The layered material, or one or more layers thereof, may exhibit a permeability at 100 Pa of about 600 liters per square meter per second ($L/m^2/s$) or greater, about 700 $L/m^2/s$ or greater, or about 800 $L/m^2/s$ or greater. The layered material, or one or more layers thereof, may exhibit a permeability of about 1500 $L/m^2/s$ or less, about 1200 $L/m^2/s$ or less, or about 1000 $L/m^2/s$ or less. This is a significant improvement over other traditional materials. For example, a polyurethane memory foam at 1100 $g/m^2$ at 15 mm thickness exhibits a permeability of about 500 $L/m^2/s$. An open cell polyurethane foam material at 600 $g/m^2$ at 20 mm thickness exhibits a permeability of less than about 100 $L/m^2/s$. A two-layered foam formed of an ethylene vinyl acetate foam layer at 10 mm thickness and polyurethane foam layer 2 mm thickness at 1100 $g/m^2$ total exhibits no permeability.

The layered material may provide cushioning while also providing moisture wicking, evaporation, thermal insulation, or the like. The layered material, or layers thereof, may exhibit resilience. Resilience may be at least in part due to the orientation of the fibers, geometry of the fibers, denier of the fibers, composition of the fibers, the like, or a combination thereof. Resilience may be measured using a standardized compression force deflection or indentation force deflection test (e.g., ASTM D3574). The desired resilience may depend upon the application within which the layered material is used. The layered material may have a resilience suitable for its intended purpose.

The layered material or one or more layers thereof (e.g., fibrous layer) may be formed to have a thickness and density selected according to the required physical, insulation, moisture absorption/resistance, and air permeability properties desired of the finished layers (and/or the layered material as a whole). The layers of the layered material may be any thickness depending on the application, location of installation, shape, fibers used, fiber geometry and/or orientation, lofting of the fibrous layers, or other factors. The density of the layers may depend, in part, on the specific gravity of any additives incorporated into the material comprising the layer (such as nonwoven material), and/or the proportion of the final material that the additives constitute. The layered material may have a varying density and/or thickness along one or more of its dimensions. Bulk density generally is a function of the specific gravity of the fibers and the porosity of the material produced from the fibers, which can be considered to represent the packing density of the fibers.

The layered material may be formed through one or more lamination techniques, or another technique capable of joining two or more layers together. The one or more layers may then be supplied as a roll or a sheet of the laminated product. The one or more layers, therefore, may be attached to each other prior to any additional shaping or molding steps.

Moisture absorption, moisture resistance, insulation, or a combination thereof of the layered material (and/or its layers) may be impacted by the shape of the layered material. The layered material, or one or more of its layers, may be generally flat. The layered material, or one of its layers, may be supplied as a sheet. The layered material or one or more of its layers may be supplied in a roll. One or more layers of the layered material may be laminated together (e.g., to supply the layered material as a sheet or roll and/or prior to any additional shaping or molding step). The finished layered material may be fabricated into cut-to-print two-dimensional flat parts depending on the desired application. The layered material may be formed into any shape. For example, the layered material may be molded (e.g., into a three-dimensional shape) to generally match a desired shape. The finished layered material may be molded-to-print into a three-dimensional shape for a desired application.

The article or material disclosed may further comprise any one or more of the features described in the specification in any combination, including the preferences and examples listed in this specification, and including any of the following features alone or in combination: the article may be a wearable item; the surface having or producing moisture may be skin of a body or a garment saturated with moisture; the one or more fibrous layers may be sandwiched between two moisture wicking layers; a moisture wicking layer may be adapted to contact the surface having or producing moisture; an outer moisture wicking layer may face away from the surface having or producing moisture; the article may be adapted to pull moisture from a user's skin, through the article, and onto an exterior surface of the article; the article or layers thereof may be permeable and/or breathable to encourage evaporation of the moisture, to allow air flow through the article or one or more layers thereof, or both; fibers of the one or more fibrous layers may have a non-circular cross-section; fibers of the one or more fibrous layers may have a cross-section having a plurality of lobes and/or deep grooves; the type and/or orientation of the fibers of the one or more fibrous layers may create a capillary effect to pull the moisture away from the surface; one or more of the moisture wicking layers may transfer moisture to the one or more fibrous layers; one or more of the moisture wicking layers may transfer moisture to the one or more fibrous layers and/or may spread the moisture over a larger surface area of the one or more fibrous layers and/or fibers thereof; the article may exhibit structural resiliency to provide cushioning; the article or one or more layers thereof may include an elastomeric binder to increase resilience of the article or the one or more layers; the fibrous layer may be formed by a vertical lapping process; the article or one or more layers thereof may be thermoformable to allow the article to be formed into a desired shape; the article or one or more layers thereof may be moldable into a three-dimensional shape; the article may be washable without losing shape, resilience, wicking properties, drying properties antimicrobial properties, or a combination thereof; the article may exhibit antimicrobial characteristics, antifungal characteristics, or both; at least a portion of the fibers of the article may be treated with or include silver or copper; at least a portion of the fibers of the article may be thermoplastic fibers; one or more layers may include fibers of polyethylene terephthalate (PET), polyacrylonitrile (PAN), oxidized polyacrylonitrile (Ox-PAN, OPAN, or PANOX), aramid, olefin, polyamide, imide, polyetherketone (PEK), polyetheretherketone (PEEK), Poly(ethylene succinate), polyether sulfonate (PES), mineral, ceramic, natural, or another polymeric fiber; the one or more fibrous layers may include bicomponent fibers; the article may be mold or mildew resistant; the article may be flexible; the article may be reusable; the article may be odor resistant; one or more of the layers may be laminated together to form a laminated product; the layers may be laminated together prior to any additional shaping or molding steps; the article may be supplied as a roll or a sheet of the laminated product.

Figure 2:
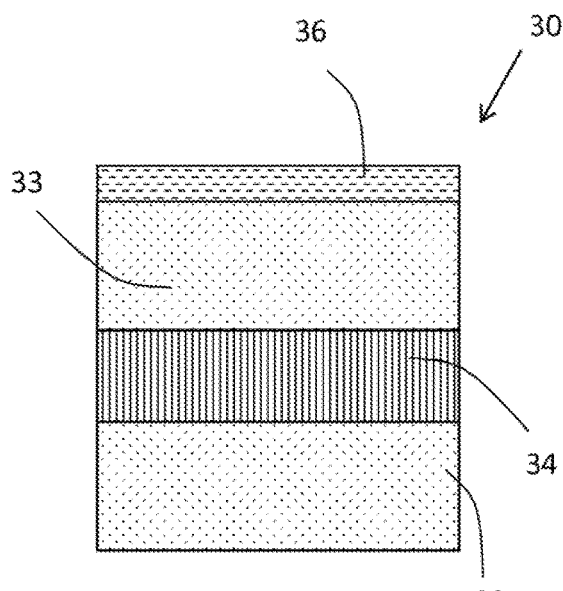
FIG. 2 is a cross-sectional view of a layered material in accordance with the present teachings.
Figure 3:
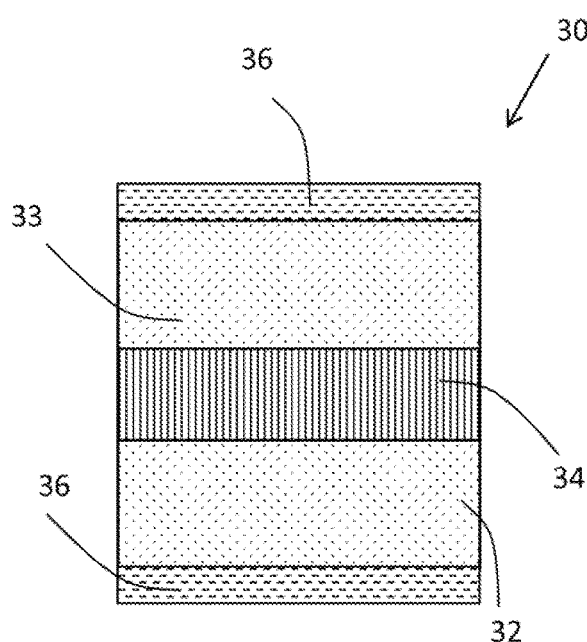
FIG. 3 is a cross-sectional view of a layered material in accordance with the present teachings.

Turning now to the figures, FIGS. 1-3 illustrates exemplary cross-sections of a layered material 30 in accordance with the present teachings. In FIG. 1, the layered material 30 includes a fibrous layer 34 disposed between a moisture transport layer 32 and an outer layer 33. As shown in FIGS. 2 and 3, the layered material 30 includes one or more surface layers 36 disposed on an exterior surface of the layered material 30.

Figure 4:
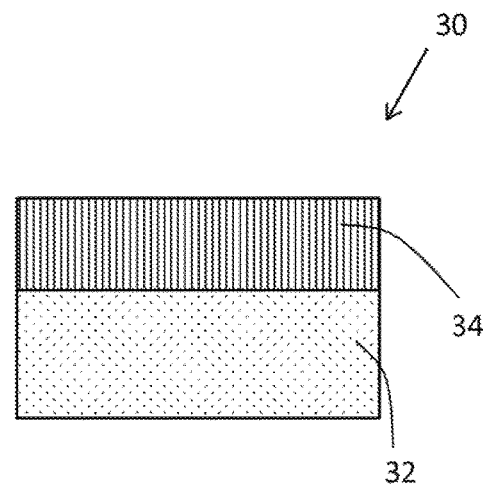
FIG. 4 is a cross-sectional view of a layered material in accordance with the present teachings.

FIG. 4 illustrates a cross-section of a layered material 30. The layered material 30 includes a fibrous layer 34 disposed on a moisture transport layer 32.

FIG. 5 illustrates a cross-section of a layered material 30 having a fibrous layer 34 and two moisture transport layers 32. The fibrous layer 34 is disposed between a moisture transport layer 32 and an outer layer 33. The fibrous layer 34 is joined to both the moisture transport layer 32 and the outer layer 33 by an optional adhesive layer 38.

Figure 7:
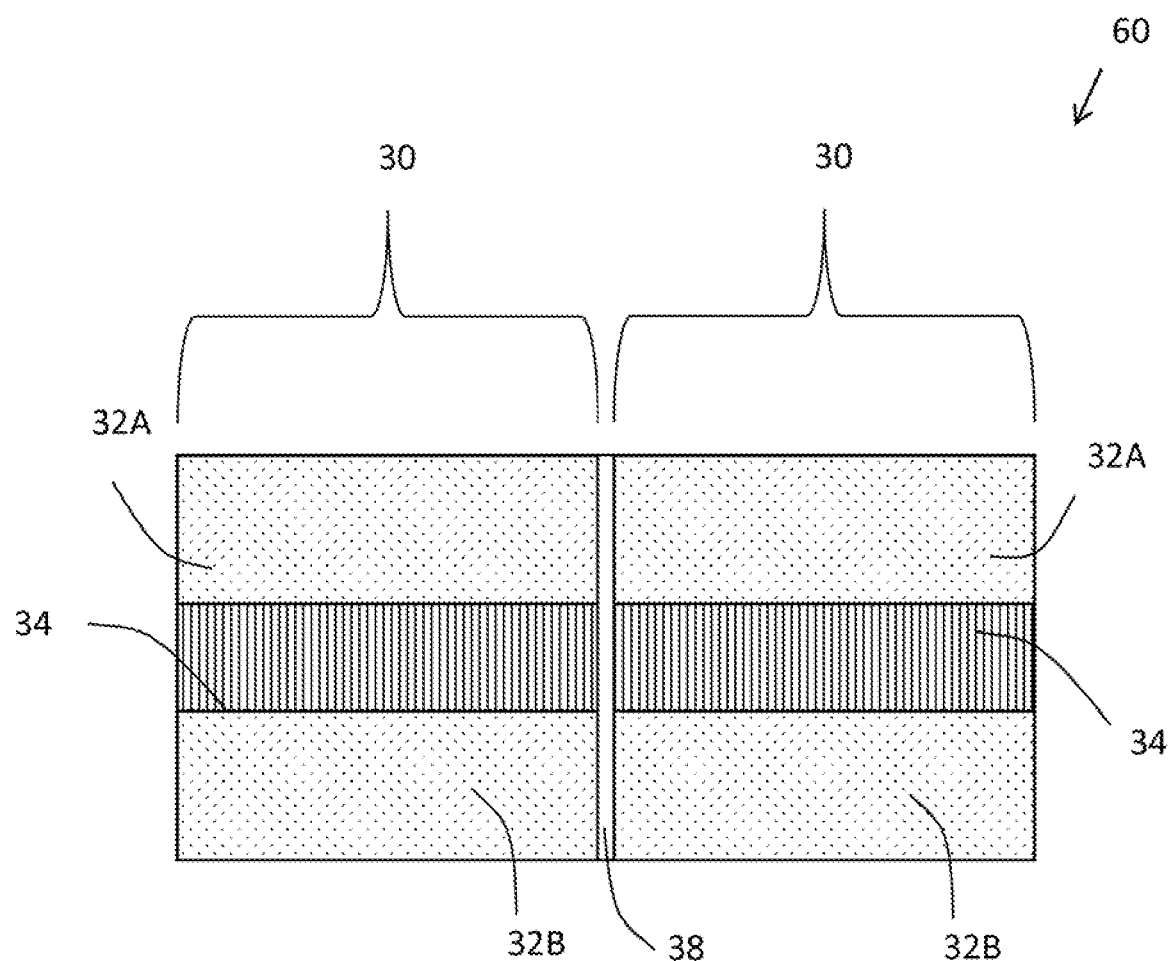
FIG. 7 is a cross-sectional view of a layered material assembly in accordance with the present teachings.

FIGS. 6 and 7 illustrate cross-sections of a layered material assembly 60. The layered material assembly 60 includes a plurality of layered materials 30 joined together via an adhesive layer 38. Each of the layered materials 30 includes a fibrous layer 34 disposed between a moisture transport layer 32 and an outer layer 33. As shown in FIG. 6, the layered materials 30 are joined by the adhesive layer 38 so that a first moisture transport layer 32 of a first layered material 30 and an outer layer 33 of a second layered material 30 abut one another to form a stacked layered material assembly 60. Alternatively, as shown in FIG. 7, the layered materials 30 are joined by the adhesive layer 38 along abutting edges of the layered materials 30.

Figure 8:
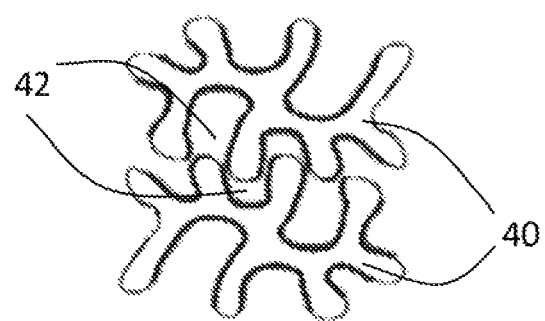
FIG. 8 is a cross-sectional, enlarged view of exemplary multi-lobal fibers in accordance with the present teachings.

FIG. 8 illustrates an enlarged cross-sectional view of multi-lobal fibers 40 in accordance with the present teachings. The multi-lobal fibers may be oriented in a generally vertical direction relative to the longitudinal axis of the fibrous layer (e.g., perpendicular to the source of the moisture). The multi-lobal cross-section of each fiber, or the interaction between multi-lobal fibers 40 may create capillaries or channels 42 through which moisture can be pulled (e.g., by capillary action).

Any of the layered materials as shown herein may have one or more facing layers one or more scrim layers, or both. For example, a facing layer (or scrim) may be positioned on a surface of a fibrous layer, facing away from the moisture transport layer. It is also contemplated that the fibrous layers, moisture transport layers, outer layers, adhesive layers, and surface layers may be configured in any combination and order Any of the materials described herein may be combined with other materials described herein (e.g., in the same layer or in different layers of the layered material). The layers may be formed from different materials. Some layers, or all of the layers, may be formed from the same materials, or may include common materials or fibers. The type of materials forming the layers, order of the layers, number of layers, positioning of layers, thickness of layers, or a combination thereof, may be chosen based on the desired properties of each material (e.g., wicking properties, cooling properties, insulative properties, and the like), the desired air flow resistive properties of the material as a whole, the desired weight, density and/or thickness of the material, the desired flexibility of the material (or locations of controlled flexibility), or a combination thereof. The layers may be selected to provide varying orientations of fibers.

While discussed in the context of wearable material, it is also within the scope of the teachings that one or more layered material layers may attach directly to a wall, surface of a substrate, surface of the area, or a combination thereof. The layered material may be attached via a fastener, adhesive, or other material capable of securing the layered material to a substrate, or other surface. The securing of the layered material to itself or to another surface may be repositionable or permanent. The layered material may include one or more fasteners, adhesives, or other known materials for joining a layered material to a substrate, another portion of the layered material, another layered material, or a combination thereof. The fastener, adhesive, or other means of attachment may be able to withstand the elements to which it is exposed (e.g., temperature fluctuations). Fasteners may include, but are not limited to, screws, nails, pins, bolts, friction-fit fasteners, snaps, hook and eye fasteners, zippers, clamps, the like, or a combination thereof. Adhesives may include any type of adhesive, such as a tape material, a peel-and-stick adhesive, a pressure sensitive adhesive, a hot melt adhesive, the like, or a combination thereof. The layered material may include one or more fasteners or adhesives to join portions of the layered material to another substrate. The layered material may include a pressure sensitive adhesive (PSA) to adhere the layered material to itself or to another surface.

EXAMPLES

The following examples are provided to illustrate the disclosed layered material and layered thereof, but are not intended to limit the scope thereof.

The samples in accordance with the present teachings for testing are prepared and shown in Table 1. All samples have a thickness of 13 mm unless otherwise noted.

TABLE 1

| Sample Name | Components of Sample | Surface Density (g/m$^2$) |
| --- | --- | --- |
| 1A | 70% thermoplastic multi-lobal fiber<br>30% elastomeric binder | 300 |
| 1B | 70% thermoplastic multi-lobal fiber<br>30% elastomeric binder | 500 |
| 2A | 70% polyethylene terephthalate fiber<br>30% elastomeric binder | 300 |
| 2B | 70% polyethylene terephthalate fiber<br>30% elastomeric binder | 500 |
| 3A | 30% polyethylene terephthalate fiber<br>30% elastomeric binder<br>40% thermoplastic multi-lobal fiber | 300 |
| 3B | 30% polyethylene terephthalate fiber<br>30% elastomeric binder<br>40% thermoplastic multi-lobal fiber | 500 |
| 4A | 70% polyethylene terephthalate fiber<br>30% polyethylene terephthalate bicomponent binder | 300 |
| 4B | 70% polyethylene terephthalate fiber<br>30% polyethylene terephthalate bicomponent binder | 500 |

Comparative samples are shown in Table 2:

TABLE 2

| Sample Name | Properties of Sample |
| --- | --- |
| Horse Memory Foam | Polyurethane foam; 1100 g/m$^2$; 15 mm thick |
| Knee Pad PU Foam | Polyurethane open cell foam; 600 g/m$^2$; 20 mm thick |
| Knee Pad PU/EVA Foam | Bi-layered material; 1110 g/m$^2$ total<br>Layer 1: ethylene vinyl acetate closed cell foam; 10 mm thick<br>Layer 2: polyurethane open cell foam; 2 mm thick |

Example 1

Cushioning tests according to ASTM D3574-3 are performed. The results of the tests are shown in Table 3.

TABLE 3

| Sample | Compression rate | Loading work WC [J] | Unloading work WC⁺ [J] | Resilience RC [−] = WC⁺/WC | Linear energy WCL [J] | Linearity LC [−] = WC/WCL |
|---|---|---|---|---|---|---|
| 1A | 50% | 4.85E-02 | 3.22E-02 | 0.66 | 8.30E-02 | 0.58 |
| 2A | 50% | 3.46E-02 | 2.24E-02 | 0.65 | 4.47E-02 | 0.77 |
| 3A | 50% | 4.78E-02 | 3.19E-02 | 0.67 | 7.18E-02 | 0.66 |
| 4A | 50% | 6.71E-02 | 4.39E-02 | 0.66 | 9.07E-02 | 0.74 |
| 1B | 50% | 1.04E-01 | 6.78E-02 | 0.65 | 2.05E-01 | 0.51 |
| 2B | 50% | 9.08E-02 | 5.81E-02 | 0.64 | 1.37E-01 | 0.66 |
| 3B | 50% | 8.35E-02 | 5.46E-02 | 0.65 | 1.34E-01 | 0.62 |
| 4B | 50% | 1.37E-01 | 8.75E-02 | 0.64 | 2.28E-01 | 0.60 |
| Horse Memory Foam | 50% | 6.53E-02 | 3.34E-02 | 0.53 | 5.20E-02 | 1.26 |
| Knee Pad PU Foam | 50% | 8.87E-02 | 4.08E-02 | 0.46 | 7.32E-02 | 1.21 |
| Knee Pad PU/EVA Foam | 50% | 1.02E-01 | 7.10E-02 | 0.70 | 1.46E-01 | 0.70 |
| 1A | 85% | 3.50E-01 | 1.90E-01 | 0.54 | 2.17E+00 | 0.16 |
| 2A | 85% | 1.93E-01 | 1.08E-01 | 0.56 | 8.53E-01 | 0.24 |
| 3A | 85% | 2.12E-01 | 1.19E-01 | 0.56 | 1.05E+00 | 0.20 |
| 4A | 85% | 1.85E-01 | 1.01E-01 | 0.55 | 6.70E-01 | 0.28 |
| 1B | 85% | 6.58E-02 | 3.72E-02 | 0.57 | 1.10E+00 | 0.06 |
| 2B | 85% | 4.33E-01 | 2.32E-01 | 0.54 | 2.43E+00 | 0.18 |
| 3B | 85% | 4.78E-01 | 2.57E-01 | 0.54 | 2.88E+00 | 0.17 |
| 4B | 85% | 6.53E-02 | 3.91E-02 | 0.60 | 5.92E-01 | 0.11 |
| Horse Memory Foam | 85% | 2.55E-01 | 1.18E-01 | 0.46 | 1.05E+00 | 0.24 |
| Knee Pad PU Foam | 85% | 2.18E-01 | 9.52E-02 | 0.44 | 4.60E-01 | 0.51 |
| Knee Pad PU/EVA Foam | 85% | 4.03E-01 | 3.17E-01 | 0.79 | 7.52E-01 | 0.54 |

| Sample | Max Force [kPa] | initial thickness [mm] | Max displacement [mm] | Displacement at 140 Pa {during unload} [mm] | gsm |
|---|---|---|---|---|---|
| 1A | 12 | 11.8 | 5.9 | 1.0 | 453 |
| 2A | 6 | 11.5 | 5.8 | 0.9 | 328 |
| 3A | 10 | 11.7 | 5.8 | 1.0 | 408 |
| 4A | 12 | 12.6 | 6.3 | 1.0 | 342 |
| 1B | 27 | 12.6 | 6.3 | 1.2 | 695 |
| 2B | 18 | 12.5 | 6.3 | 1.1 | 595 |
| 3B | 18 | 12.1 | 6.0 | 0.9 | 551 |
| 4B | 25 | 15.0 | 7.5 | 1.5 | 612 |
| Horse Memory Foam | 6 | 15.2 | 7.5 | 0.8 | 1032 |
| Knee Pad PU Foam | 14 | 17.1 | 8.5 | 1.4 | 596 |
| Knee Pad PU/EVA Foam | 84 | 9.9 | 5.1 | 1.5 | 1064 |
| 1A | 175 | 11.9 | 10.1 | 2.4 | 452 |
| 2A | 68 | 11.8 | 10.0 | 1.8 | 385 |
| 3A | 89 | 11.2 | 9.5 | 1.8 | 366 |
| 4A | 50 | 12.9 | 10.9 | 2.2 | 330 |
| 1B | 92 | 11.4 | 9.0 | 2.0 | 459 |
| 2B | 192 | 12.3 | 10.5 | 1.9 | 556 |
| 3B | 226 | 12.2 | 10.3 | 2.2 | 551 |
| 4B | 41 | 13.7 | 9.0 | 1.6 | 671 |
| Horse Memory Foam | 66 | 15.1 | 12.8 | 1.0 | 999 |
| Knee Pad PU Foam | 51 | 17.1 | 14.6 | 2.2 | 601 |
| Knee Pad PU/EVA Foam | 244 | 10.3 | 8.9 | 2.5 | 1070 |

As shown by the table, the column "Max Force [kPa]" shows that the samples identified in Table 1 sustain a higher load as compared to open cell foams while being significantly lighter. The column "Resilience" shows that the samples identified in Table 1 are more resilient as compared to open cell foams while being significantly lighter. The column "Linearity" shows that the linearity of the samples identified in Table 1 is generally lower. Non-linearity is correlated to the soft touch/handle of the fabric.

Example 2

Sweating guarded-hotplate testing is performed according to ISO 11092. The testing seems to measure thermal and water vapor resistance under steady-state conditions. The results of the tests are shown in Table 4.

TABLE 4

| Sample | Thermal Resistance (m²K/W) | Water Vapor Resistance (m²Pa/W) | Permeability Index |
|---|---|---|---|
| 1 mm of calm air | 0.037 | 2.2 | 1.0 |
| Polyurethane foam; 1100 g/m2; 15 mm thickness | 0.374 | 56 | 0.4 |
| Sample 1B | 0.321 | 27 | 0.7 |

The test results show Sample 1B has similar thermal resistance compared to the polyurethane foam, which is twice the mass. This would give similar cold thermal protection in cold temperatures. Moreover, the Vapor Resistance is almost half for Sample 1B than the polyurethane foam, meaning that the moisture is evacuated almost two times more easily. This leads to a Permeability Index that is significantly higher, which is generally correlated with better comfort.

Example 3

Testing is performed to test the wicking attributes of the samples. 150 mL of water is added to a 173 mm diameter container. This 150 mL correspond to about three times the maximum volume of the samples so that there will be enough water, regardless of wicking properties of the samples. The size of the container (i.e., being larger than the sample) allows the sample to emerge out of the water so that the wicking process can be observed. The samples are put on the top of the water in the container. If the sample has wicking capabilities, it plunges into the water and then by capillarity, the water is absorbed by the sample and moves up into the sample. If nothing happens, the sample is forced into the water after 10 seconds. After a certain time "tmax", which is recorded for each sample, the water reaches a maximum height inside the sample. This height is then normalized by sample height. The test is stopped after 30 seconds (>>tmax). The mass of the sample is then measured. This measures the quantity of water the material can wick. The results of the testing are shown in Table 5.

TABLE 5

| Sample | 4B | 4B | 2B | 2B | 3B | 3B | 1B | 1B | Horse Memory Foam | Knee Pad PU Foam |
|---|---|---|---|---|---|---|---|---|---|---|
| Trial | I | II | I | III | I | II | I | II | | |
| Surface density (g/m$^2$) | 500 | 500 | 500 | 500 | 500 | 500 | 500 | 500 | 1000 | 600 |
| Target thickness (mm) | 15 | 15 | 13 | 13 | 13 | 13 | 13 | 13 | 15 | 20 |
| Initial mass (g) | 1.4446 | 1.0158 | 1.486 | 1.4319 | 1.3694 | 1.3531 | 1.7419 | 1.712 | 2.454 | 1.495 |
| Final mass (g) | 30.54 | 29.5655 | 7.7 | 9.611 | 19.2924 | 20.3 | 26.295 | 27.279 | 3.846 | 2.85 |
| Ratio volume (%) | 78% | 78% | 20% | 27% | 62% | 63% | 78% | 83% | 4% | 3% |
| End time (s) | 6 | 6 | pushed | pushed | 6 | 6 | 3 | 3 | pushed | pushed |
| Thickness (mm) | 15.1 | 14.9 | 12.5 | 12.3 | 11.8 | 12.2 | 12.8 | 12.5 | 15 | 20 |
| Height @ 10s (mm) | 12 | 12 | 1 | 3 | 9 | 9 | 12 | 12 | 2 | 3 |
| Ratio height @ 10s (%) | 79% | 81% | 8% | 24% | 76% | 74% | 94% | 96% | 13% | 15% |

Example 4

Testing is performed to measure the moisture evaporation of each sample. Each sample is cut to have a diameter of 56 mm. The thickness of each sample is 13 mm. A container having a diameter of about 59 mm and a wall height of about 8 mm is filled with 10 mL of water (thereby having a height of about 4 mm). Each sample is laid in the container with water. The mass of the sample over time is recorded to measure how quickly the moisture evaporates through the sample. For evaporation to occur, the sample wicks the water to the top of the sample. The results of the testing are shown in Table 6.

TABLE 6

| Material Description | Dry Specimen Mass Pre-Testing (g) | Dry Specimen Mass Post-Testing (g) | Starting Water Mass (g) | Relative Humidity (%) | Temp. (° F.) | Dry Time (Days) |
|---|---|---|---|---|---|---|
| Sample 1B, Specimen I | 1.74 | 1.75 | 9.62 | 38.00 | 74.50 | 1.21 |
| Sample 1B, Specimen II | 1.72 | 1.72 | 9.77 | 38.00 | 73.90 | 1.33 |
| Sample 4B, Specimen I | 1.46 | 1.48 | 9.72 | 40.00 | 74.70 | 1.54 |
| Sample 3B, Specimen II | 1.37 | 1.37 | 9.72 | 41.00 | 74.80 | 1.25 |
| Sample 2B, Specimen I | 1.48 | 1.49 | 9.80 | 42.00 | 74.30 | 1.58 |
| Knee Pad PU Foam, Specimen I | 1.50 | 1.50 | 9.80 | 38.00 | 73.90 | 1.83 |
| Horse Memory Foam, Specimen I | 2.45 | 2.45 | 9.80 | 42.00 | 73.90 | 3.08 |
| Horse Memory Foam, Specimen II | 2.52 | 2.52 | 9.67 | 39 | 74.5 | 1.62 |

The test results show that the addition of the multi-lobal fiber in Samples 1 and 3 that the rate of drying is increased or drying time is decreased. Specimens without the multi-lobal fiber (Samples 2 and 4) dry more slowly. Open cell polyurethane foam also takes longer to dry than all fiber samples.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A wearable, washable, and reusable multi-layer article having a user contacting surface and an exterior surface, the article comprising:
   a. one or more moisture wicking layers; and
   b. a nonwoven fibrous layer having a plurality of fibers including generally vertically oriented fibers, wherein the plurality of fibers of the fibrous layer are carded and lapped into a three-dimensional structure;
      wherein at least a portion of the generally vertically oriented fibers of the fibrous layer are positioned within the article to be oriented generally perpendicularly to a surface having or producing moisture;
      wherein the fibrous layer includes bi-component fibers that are fused in space as a network so that the article has sufficient structure and body and the fibrous layer has a permeability of about 600 L/m$^2$/s or greater at 100 Pa;
      wherein the article is adapted to remove the moisture from the surface having or producing moisture via one or more of the moisture wicking layers transferring moisture to the fibrous layer;
      wherein the article is a three-dimensional shaped thermoformable and/or moldable article having a desired shape;
      wherein the article is adapted to pull the moisture through the article, and onto the exterior surface of the article, wherein the exterior surface is an outermost surface of the article;
      wherein each layer of the article is permeable and/or breathable to encourage evaporation of the moisture and, to allow air flow through the article all of the layers of the article.

2. The article of claim 1, wherein the surface having or producing moisture is skin of a body.

3. The article of claim 2, wherein the fibrous layer is sandwiched between two moisture wicking layers, wherein one of the moisture wicking layers is adapted to contact the skin, and an opposing moisture wicking layer faces away from the skin.

4. The article of claim 1, wherein the fibrous layer is sandwiched between two moisture wicking layers.

5. The article of claim 4, wherein the article includes an outer moisture wicking layer that faces away from the surface having or producing moisture.

6. The article of claim 1, wherein one of the moisture wicking layers is adapted to contact the surface having or producing moisture.

7. The article of claim 1, wherein fibers of the fibrous layer have a non-circular cross-section.

8. The article of claim 7, wherein fibers of the fibrous layer have a cross-section having a plurality of lobes and/or deep grooves.

9. The article of claim 1, wherein the type and/or orientation of the fibers of the fibrous layer creates a capillary effect to pull the moisture away from the surface.

10. The article of claim 1, wherein one or more of the moisture wicking layers transfers moisture to the fibrous layer and spreads the moisture over a larger surface area of the one or more fibrous layers and/or fibers thereof.

11. The article of claim 1, wherein the article exhibits structural resiliency to provide cushioning.

12. The article of claim 1, wherein the fibrous layer is formed by a vertical lapping process.

13. The article of claim 1, wherein the article exhibits antimicrobial characteristics, antifungal characteristics, odor resistance, mold or mildew resistance, or a combination thereof.

14. The article of claim 1, wherein at least a portion of the fibers of the article are treated with or include silver or copper.

15. The article of claim 1, wherein one or more layers include fibers having embedded particles comprising active carbon, sand, fruit or nut shells, or a combination thereof.

16. The article of claim 1, wherein the fibrous layer includes fibers selected from polybutylene terephthalate (PBT), polyethylene terephthalate (PET), polytrimethylene terephthalate (PTT), co-polyester/polyester (CoPET/PET) adhesive bi-component fibers, or a combination thereof.

17. The article of claim 16, wherein the fibrous layer includes fibers including PET and bi-component fibers including a copolymer including PET.

18. The article of claim 16, wherein the fibrous layer includes elastic bicomponent PET, PBT, PTT or a combination thereof.

19. The article of claim 1, wherein the article has a permeability of about 600 L/m²/s or greater at 100 Pa.

* * * * *